United States Patent [19]

Kisuna et al.

[11] 4,025,897
[45] May 24, 1977

[54] SHIFT-TIME INDICATING SYSTEM

[75] Inventors: Keiichi Kisuna, Nagoya; Yasuyoshi Akamatsu, Okazaki, both of Japan

[73] Assignee: Mitsubishi Jidosha Kogyo Kabushiki Kaisha, Tokyo, Japan

[22] Filed: May 20, 1976

[21] Appl. No.: 688,402

[30] Foreign Application Priority Data

June 10, 1975  Japan .............................. 50-70560

[52] U.S. Cl. .............................. 340/52 R; 340/52 D
[51] Int. Cl.² .......................................... B60Q 1/00
[58] Field of Search ................ 340/52 R, 52 D, 282

[56] References Cited

UNITED STATES PATENTS 3,296,607   1/1967   Pasinski ........................... 340/52 R Primary Examiner—Alvin H. Waring
Attorney, Agent, or Firm—Oldham & Oldham Co.

[57] ABSTRACT

A shift-time indicating system for a manually operated transmission comprising two actuating circuits for shift-up and shift-down indicators, said circuits being arranged in parallel through change-over switches. The switches are operated in response to positions of a shift lever of the transmission and to an intake negative pressure of an engine. Each indicator is actuated when both of the switches are connected to the corresponding circuit, thereby indicating the driver a necessity of shift-up or shift-down.

7 Claims, 5 Drawing Figures

SHIFT-TIME INDICATING SYSTEM

BACKGROUND OF THE INVENTION

This invention relates to a shift-time indicating system, in particular, for an over top mechanism or a sub-transmission for a motor vehicle which is operated by a hand-operated shift lever. The shift-time indicating system senses loading conditions of an engine to indicate an exact timing of gear shift to a driver, thereby enabling timely operation of the shift lever and effecting a decrease in fuel consumption.

There has been provided a transmission which is automatically shifted to an over top gear depending on the loading conditions of the engine. However, such transmission is complicated in its construction and expensive. Furthermore, in the transmission of conventional type in which shift to over-top or change-over of a sub-transmission is manually operated, shifting operation is carried out depending on human senses, such as by hearing the engine noises in order to perceive the loading condition.

Therefore, with the above manually operated speed changing gear, it is impossible, during high speed steady driving, to keep on selections of shift ranges which are most pertinent in relation to the fuel consumption, thereby defectively causing an increase in the fuel consumption.

SUMMARY OF THE INVENTION

To avoid the above defect, the present invention provides a shift-time indicating system comprising a first actuating circuit for a shift-up indicator and a second actuating circuit for a shift-down indicator, terminals of said first circuit and terminals of said second circuit being connected in parallel through change-over switches respectively, one of said change-over switches being connected with said second circuit when a shift lever for a manually operated transmission is in a high speed position and connected with said first circuit when said lever is in a low speed position, the other change-over switch being operated in response to values of an intake negative pressure of an engine, said other change-over switch being connected with said first circuit when the intake negative pressure is higher than a first set value and connected with said second circuit when the intake negative pressure is below a second set value lower than said first set value, said other change-over switch being disconnected from said first and second circuits when the intake negative pressure is between said first and second set values, connections of said two switches with either of said first and second circuits causing actuation of said shift-up indicator or said shift-down indicator respectively.

In a preferred embodiment, the change-over switch operative in response to the intake negative pressure of the engine is interlocked with a differential pressure responsive member of a differential pressure responsive means. The differential pressure responsive means is communicated with the intake negative pressure through a passage.

In another embodiment, an acceleration switch is connected in series to actuating circuits arranged in parallel with each other. The acceleration switch is closed when opening of a throttle exceeds a predetermined value and the shift-up indicator and the shift-down indicator are operative only during said acceleration switch is closed.

In a further embodiment, a surge-tank and/or an orifice are provided in the passage to open or close the circuits in accordance with the values of the negative pressure imposed on the differential pressure responsive means.

In a further embodiment, a timer is connected in series to the circuits so that said shift-up indicator or shift-down indicator is operated with a given time lag when both of the switches are connected to the corresponding circuit.

In a further embodiment, at least one of the circuits is provided with a timer, so that the shift-up indicator or shift-down indicator is operated with a predetermined time lag where the timer is provided, but is operated immediately where no timer is provided when both of the change-over switches are connected to the corresponding circuit.

DETAILED DESCRIPTION OF THE PREFERRED EMBODIMENTS

Figure 1:
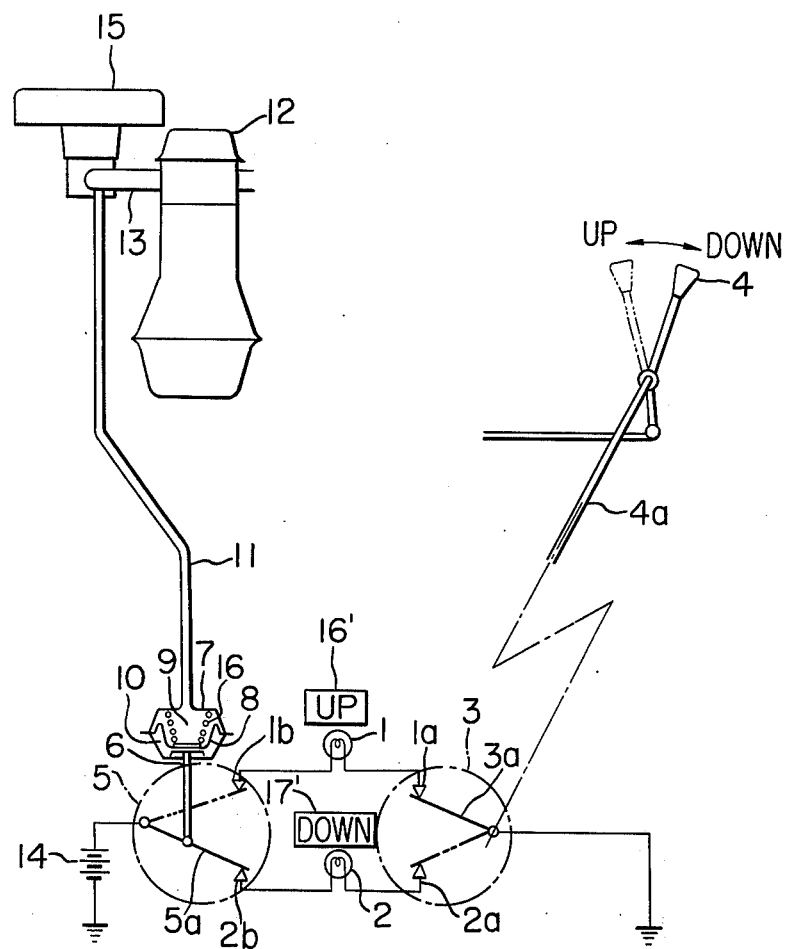
FIG. 1 is a diagramatic view showing the first embodiment of the shift-time indicating system according to this invention.

In all the drawings, same reference numerals are adopted for the similar or corresponding parts.

In FIG. 1 showing the first embodiment of the shift-time indicating system, a shift-up indicator lamp 1 having terminals 1a and 1b and a shift-down indicator lamp 2 having terminals 2a and 2b are fitted on an instrument panel in a driver's cab (not shown). The terminals 1a and 2a are selectively contacted with a movable terminal 3a of a change-over switch 3. The terminal 3a is interlocked with a shift lever 4 through a link mechanism 4a and moved in response to shift operation of the lever between low speed gear of e.g. gear ratio of 3.5 and high speed gear of e.g. gear ratio of 2.5. When the shift lever 4 is in the high speed gear position as shown by a chain line in FIG. 1, the terminal 2a contacts with the movable terminal 3a, whereas the terminal 1a contacts with the movable terminal 3a when the shift lever 4 is in the low speed gear position as shown by full lines in FIG. 1.

The terminals 1b and 2b are intermittently contacted with a movable terminal 5a of a change-over switch 5. The movable terminal 5a is linked to an operating rod 6 secured to the center portion of a diaphragm 8 of a diaphragm vacuum motor 7. The vacuum motor 7 has two compartments 9 and 10 divided by the diaphragm 8. One compartment 9 is communicated with an intake manifold of an engine 12 through a negative pressure passage 11 and the other compartment 10 is opened to atmosphere. A coil spring 16 is located in said compartment 9 to urge the diaphragm 8 in the direction from the compartment 9 toward the compartment 10, so that the movable terminal 5a contacts with the terminal 1b when a negative pressure in the compartment 9 is higher than the set value C, as shown by a chain line in FIG. 1. When the negative pressure in the compartment 9 becomes lower than the set value D the movable terminal 5a contacts the terminal 2b, as shown by the full lines in FIG. 1. In the present invention, the set values C and D are respectively set up at −300 mm Hg and −70 mm Hg, and the movable terminal 5a is held off either of the terminals 1b and 2b when the negative pressure is between said values C and D (−300 mm Hg and −70 mm Hg).

Further, the reference numeral 14 indicates a battery, 15 is an air-cleaner and 16', 17' are indicator plates on the instrument panel.

Figure 2:
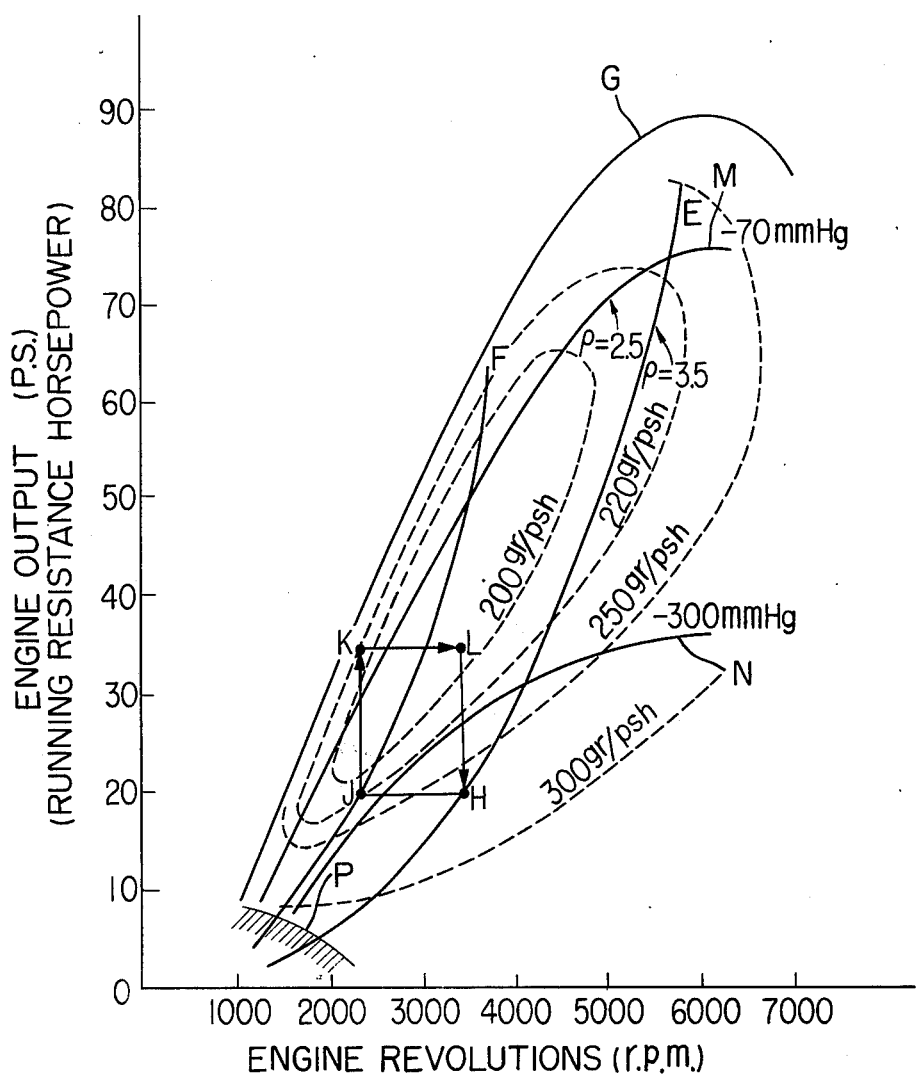
FIG. 2 is an explanatory drawing showing the operation of the first embodiment.

Now, the operation of the first embodiment will be explained, referring to FIG. 2, as follows:

In FIG. 2, revolutions of the engine (rpm) are plotted on abscissa and an output of the engine (P.S.) is plotted on ordinate. The full line G is an output curve when throttle valve is fully opened. The full line E is a curve of running resistance horsepower on a flat road with a gear ratio of 3.5. F is a curve running resistance horsepower on the flat road with a gear ratio of 2.5. The broken lines are the constant fuel consumption curves. The full line M is a curve of constant negative pressure at intake manifold of −70 mm Hg and the full line N is a curve of constant negative pressure at intake manifold of −300 mm Hg. The full line P is a constant throttle opening line with a degree of 15°.

The engine output during a steady driving is in balance with the running resistance horsepower. When driving at the point H on the full line E, fuel consumption is not good as 250 gr/PS·h. In this driving, since the shift lever 4 has been shifted to the low speed gear, the ratio of which is 3.5, the movable terminal 3a of the change-over switch 3 contacts with the terminal 1a. Also, as the negative pressure at the intake manifold is more than −300 mm Hg and communicated to the compartment 9 through the negative pressure passage 11, the diaphragm 8 is pulled upward against the force of the spring 16 and the movable terminal 5a connected to the operating rod 6 is moved upward to contact with the terminal 1b. Thus, a battery 14 is electrically connected to the lamp 1 to light it to indicate the driver a necessity of shift-up.

By the driver's shifting up of the shift lever 4 to a high speed gear position shown by the chain line, the movable terminal 3a of the change-over switch 3 is correspondingly shifted to part from the terminal 1a and to contact with the terminal 2a. In this state, the lamp 1 is deenergized. Also, the point H in FIG. 2 is moved to the point J on the full line F and the fuel consumption decreases to 220 gr/PS·h, thus effecting an economical driving. On the other hand, in this state, the negative pressure at the intake manifold is between −70 mm Hg and −300 mm Hg, holding off the movable terminal 5a of the change-over switch 5 from both of the terminals 1b and 2b.

In this state with the gear ratio of 2.5 at the high speed gear position, climbing or acceleration of the vehicle will increase the running resistance and the point J is moved to the point K in FIG. 2, thereby increasing the fuel consumption to more than 220 gr/PS·h.

In this case, as the negative pressure at the intake manifold of the engine 12 is lower than −70 mm Hg coming near the atmospheric pressure and communicated to the compartment 9, the diaphragm 8 is urged downward by the force of the spring 16 and the movable terminal 5a comes into contact with the terminal 2b. Thus, the battery 14 is electrically connected to the lamp 2 to light it to indicate the driver a necessity of shift-down.

By the driver's shifting of the shift lever 4 to the low speed gear position shown by the full line in FIG. 1, the movable terminal 3a of the change-over switch is correspondingly moved to separate from the terminal 2a and to contact with the terminal 1a. In this state, the lamp 2 is deenergized. Also, the point K in FIG. 2 is moved to the point L and the fuel consumption decreases to 200 gr/PS·h.

On the other hand, in this state, the negative pressure at the intake manifold is between −70 mm Hg and −300 mm Hg, holding off the movable terminal 5a of the change-over switch 5 from both of the terminals 1b and 2b.

In this state with the gear ratio of 3.5 at the low speed gear position, the running resistance horsepower at the point L will move to the point H in FIG. 2 at the end of the climbing or acceleration. The above described operations are repeatedly performed as necessary.

Hence, according to the present invention, the driver is ensured to satisfactorily select pertinent transmission gears for better fuel consumption depending on the driving conditions and to achieve a driving with low fuel consumption.

Figure 3:
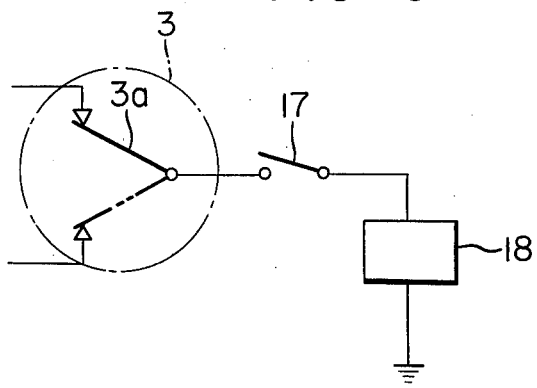
FIG. 3 is a diagramatic and partly enlarged view showing the second embodiment of this invention.

Referring to FIG. 3, the second embodiment of this invention is provided with an acceleration switch 17 and a timer 18 connected in series to the movable terminal 3a of the change-over switch 3 of the above first embodiment. The acceleration switch 17 is arranged to be closed when a throttle opening of a throttle valve (not shown) becomes more than a predetermined value, e.g., 15°. Also, the timer 18 is designed to light the lamp 1 or 2 with a time lag of, e.g., 5 sec. As clear from FIG. 2, in this embodiment, unnecessary lighting of the lamp 1 or 2 is prevented during idling or driving at low speed in a hatching region P with throttle opening of less than 15° where a selection of high speed gear or low speed gear has no effect on the fuel consumption at all. Also, a blinking actuation of the lamp 1 or 2, due to momentary operation of the vacuum motor 7 caused by a rapid acceleration, rapid deceleration or any other temporary change in driving condition is prevented by operation of the timer 18.

Figure 4:
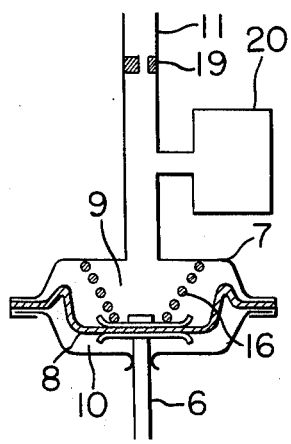
FIG. 4 is a diagramatic and partly enlarged view showing the third embodiment of this invention.

Referring to FIG. 4, the third embodiment of the present invention is shown and provided with an orifice 19 in the negative pressure passage 11 and a surge tank 20 in the negative pressure passage 11 between said orifice 19 and the vacuum motor 7 of the first embodiment. In this embodiment, as any abrupt variation in the negative pressure at the intake manifold is communicated to the compartment 9 with a given time lag by means of the orifice 19 and the surge tank 20, similar effect as brought by the timer 18 in the second embodiment is obtainable.

Figure 5:
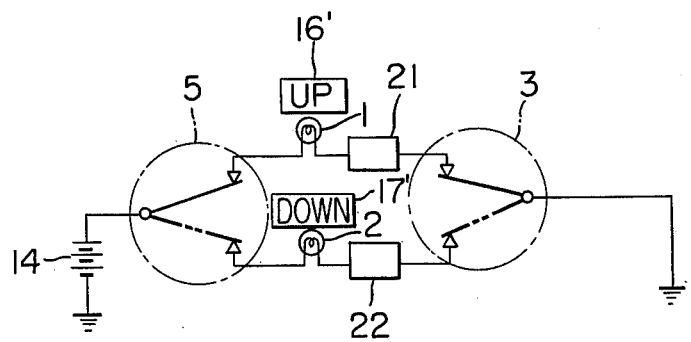
FIG. 5 is a diagramatic and partly enlarged view showing the fourth embodiment of this invention.

Referring to FIG. 5, the fourth embodiment of the present invention is shown and provided with a timer 21 connected in series with the lamp 1 and a timer 22 connected in series with the lamp 2 of the first embodiment. In this embodiment, when the change-over switches 3 and 5 are in the state shown by the full line in FIG. 5, the timer 21 is operated during its established time and thereafter the lamp 1 is lighted. Also, when the change-over switches 3 and 5 are in the state shown by the chain line, the timer 22 is operated during its established time and thereafter the lamp 2 is lighted. Thus, by establishing the operating time of the timer 21 and 22 at pertinent values respectively, confusingly blinking operation of the lamp 1 or 2 due to a temporary change in the driving condition can be avoided.

In each of the above embodiments, though the diaphragm type vacuum motor 7 is used for operation of the change-over switch 5, any other differential pressure responsive member such as a piston which is displaced depending on the values of negative pressure at the intake manifold may be used to obtain the same effects.

Also in lieu of the lamp 1 and 2 used in the above embodiments to indicate shift-up and shift-down necessities, any other alarm or warning means, such as a buzzer may be used.

What is claimed is:

1. A shift-time indicating system comprising a first actuating circuit for a shift-up indicator and a second actuating circuit for a shift-down indicator, terminals of said first circuit and terminals of said second circuit being connected in parallel through change-over switches respectively, one of said change-over switches being connected with said second circuit when a shift lever for a manually operated transmission is in a high speed position and connected with said first circuit when said lever is in a low speed position, the other change-over switch being operated in response to values of an intake negative pressure of an engine, said other change-over switch being connected with said first circuit when the intake negative pressure is higher than a first set value and connected with said second circuit when the intake negative pressure is below a second set value lower than said first set value, said other change-over switch being disconnected from said first and second circuits when the intake negative pressure is between said first and second set values, connections of said two switches with either of said first and second circuits causing actuation of said shift-up indicator or said shift-down indicator respectively.

2. A shift-time indicating system according to claim 1, wherein a differential pressure responsive means is communicated with the intake negative pressure through a passage and has a differential pressure responsive member, said differential pressure responsive member being interlocked with said other change-over switch and resiliently urged to connect it with said second actuating circuit when the negative pressure is below the second set value.

3. A shift-time indicating system according to claim 1, wherein an acceleration switch is connected in series to said first and second actuating circuits and arranged to be closed when opening of a throttle exceeds a predetermined value, said actuation of the indicators being effected when said acceleration switch is in a closed condition.

4. A shift-time indicating system according to claim 3, wherein a timer is connected in series to said first and second actuating circuits, each of said indicators being actuated with a predetermined time lag by operation of said timer when the change-over switches are connected with the corresponding circuit.

5. A shift-time indicating system according to claim 2, wherein an orifice is provided in said passage to communicate variation in the negative pressure to the differential pressure responsive means with a given time lag.

6. A shift-time indicating system according to claim 5, wherein a surge tank is provided between said orifice and said differential pressure responsive means.

7. A shift-time indicating system according to claim 1, wherein at least one of said actuating circuits is provided with a timer to delay the actuation of the corresponding indicator for a predetermined time.

* * * * *